(12) United States Patent
Hosain et al.

(10) Patent No.: US 7,653,186 B2
(45) Date of Patent: Jan. 26, 2010

(54) SYSTEM AND METHOD FOR EVENT COMMUNICATION CORRELATION

(75) Inventors: Syed Zaeem Hosain, San Jose, CA (US); Robert Fultz, Boulder Creek, CA (US); Kirk Brezee, Richmond, CA (US); Byung Hoon Sim, Santa Clara, CA (US); Lotus Lin Weygandt, Los Gatos, CA (US); Dae Seong Kim, Campbell, CA (US)

(73) Assignee: Aeris Communications, Inc., San Jose, CA (US)

( * ) Notice: Subject to any disclaimer, the term of this patent is extended or adjusted under 35 U.S.C. 154(b) by 67 days.

(21) Appl. No.: 11/754,171

(22) Filed: May 25, 2007

(65) Prior Publication Data

US 2007/0287430 A1 Dec. 13, 2007

Related U.S. Application Data

(60) Provisional application No. 60/808,839, filed on May 26, 2006.

(51) Int. Cl.
 *H04M 11/00* (2006.01)
(52) U.S. Cl. ............... 379/106.01; 379/45; 379/39; 379/40
(58) Field of Classification Search ............ 379/45, 379/37, 39; 455/404.1, 404.2; 370/352
See application file for complete search history.

(56) References Cited

U.S. PATENT DOCUMENTS

| | | | |
|---|---|---|---|
| 5,173,935 A | 12/1992 | Meschi | |
| 5,475,742 A | 12/1995 | Gilbert | |
| 5,594,740 A | 1/1997 | LaDue | |
| 5,845,203 A | 12/1998 | LaDue | |
| 5,940,004 A | 8/1999 | Fulton | |
| 6,297,768 B1 | 10/2001 | Allen, Jr. | |
| 6,340,928 B1* | 1/2002 | McCurdy | 340/436 |
| 6,476,763 B2 | 11/2002 | Allen, Jr. | |
| 6,484,035 B2 | 11/2002 | Allen, Jr. | |
| 6,658,095 B1 | 12/2003 | Yoakum et al. | |
| 6,710,738 B2 | 3/2004 | Allen, Jr. | |

(Continued)

OTHER PUBLICATIONS

"In-band signaling," Wikipedia, http://en.wikipedia.org/wiki/Inband, printed Apr. 20, 2007, 2 pgs.

(Continued)

*Primary Examiner*—Stella L Woo
(74) *Attorney, Agent, or Firm*—Blakely, Sokoloff, Taylor & Zafman LLP

(57) ABSTRACT

A system, method, and apparatus method for receiving one or more communications from a remote terminal, transmitted via a telephone exchange, the communications comprising telemetry data and voice data; selecting a call center from a plurality of call centers to receive a communication from the remote terminal, wherein selecting the call center is based at least in part on the telemetry data; sending a message from the service provider to the call center over a side-channel, the message comprising at least a portion of the telemetry data, and further comprising a request for a communication path to one of a plurality of operator stations connected with the call center; and sending the voice data to the one operator station over a public switched telephone network (PSTN) connection via the communication path requested.

34 Claims, 4 Drawing Sheets

U.S. PATENT DOCUMENTS

| | | | |
|---|---|---|---|
| 2001/0021646 A1 | 9/2001 | Antonucci et al. | |
| 2002/0016158 A1 | 2/2002 | Page et al. | |
| 2002/0103622 A1* | 8/2002 | Burge | 702/183 |
| 2003/0221118 A1 | 11/2003 | Walker | |
| 2004/0105529 A1* | 6/2004 | Salvucci et al. | 379/45 |
| 2005/0040937 A1* | 2/2005 | Cuddihy et al. | 340/436 |
| 2005/0137797 A1 | 6/2005 | Oesterling et al. | |
| 2005/0221863 A1 | 10/2005 | Howe | |
| 2006/0046720 A1 | 3/2006 | Toropainen et al. | |
| 2006/0140382 A1* | 6/2006 | Huey | 379/37 |
| 2007/0071181 A1* | 3/2007 | Hwang | 379/45 |
| 2007/0247289 A1* | 10/2007 | Buckley et al. | 340/426.3 |

OTHER PUBLICATIONS

Jason Meyers, "MicroBurst bursts onto data scene: Aeris gives wireless telemetry a new look," Telephony Online, http://telephonyonline.com/mag/telecom_microburst_bursts_onto/, Jan. 12, 1998, 3 pgs.

"Direct Inward Dialing," Wikipedia, http://en.wikipedia.org/wiki/Direct_Inward_Dialing, printed Apr. 20, 2007, 2 pgs.

"Caller ID," Wikipedia, http://en.wikipedia.org/wiki/Caller_id, printed Apr. 20, 2007, 4 pgs.

"Short message service," Wikipedia, http://en.wikipedia.org/wiki/Sms, printed May 7, 2007, 13 pgs.

"The Rise of Intelligent Devices," Aeris.net, http://www.aeris.net/news_events/pdfs/TheRiseofIntelligentDevices.pdf, (no publication date available) printed Aug. 16, 2007, 9 pgs.

PCT Search Report for PCT/US07/12618, mailed Aug. 20, 2008, 8 pgs.

International Search Report and Written Opinion for PCT/US2008/008790, mailed Oct. 8, 2008, 11 pgs.

\* cited by examiner

SYSTEM AND METHOD FOR EVENT COMMUNICATION CORRELATION

CROSS-REFERENCE TO RELATED APPLICATIONS

This application claims the benefit of U.S. provisional patent application No. 60/808,839 entitled "System and Method for Event Communication Correlation," filed May 26, 2006.

TECHNICAL FIELD

This invention relates to the field of telephonic communication systems, methods, devices, and more particularly, to a system and method for receiving one or more communications from a remote terminal, transmitted via a telephone exchange, the communications comprising telemetry data and voice data; selecting a call center from a plurality of call centers to receive a communication from the remote terminal, wherein selecting the call center is based at least in part on the telemetry data; sending a message from the service provider to the call center over a side-channel, the message comprising at least a portion of the telemetry data, and further comprising a request for a communication path to one of a plurality of operator stations connected with the call center; and sending the voice data to the one operator station over a public switched telephone network (PSTN) connection via the communication path requested.

BACKGROUND

Event communication correlation is the process of associating an event communication, such as an incoming telephone call from a customer, with additional information associated with the person, entity, or device from which the communication originates. Take for example a customer of a utility company calling to inquire about his utility bill. The utility company must correlate the incoming phone call with additional relevant information for the customer, such as the customer's account information. In this context, a historical "event communication correlation" process is described.

A call center such as the utility company has no advance notice that a customer will be calling, and thus cannot prearrange to correlate a phone call with relevant account information to service the phone call. When the customer's phone call does arrive, the utility company will receive little or no information describing the content of the phone call. In limited circumstances, the utility company may receive caller identification ("caller-ID") information describing the phone number of the originating location or ANI (automatic number identification) information, likewise describing the phone number of the originating location.

When an incoming phone call is received at the utility company, via the public switched telephone network ("PSTN"), it is generally placed into a hold queue. The customer's phone call remains in the hold queue with several other phone calls from other customers, each call waiting to be answered by the next available customer service operator ("operator"). Time in the hold queue varies from just a few seconds to many minutes and is unaffected by the urgency of the customer's phone call, the content of the phone call, the event triggering the necessity of the phone call, or any classification that the utility company has assigned the customer. The time a phone call remains in the hold queue is primarily affected by the ratio of operators servicing the hold queue to the number of connected phone calls.

Eventually, the customer's phone call moves to the front of the hold queue and is answered by the next available operator, just one of many operators at this particular call center representing the utility company. When the customer inquires about his bill, the operator must somehow correlate the customer with the appropriate account information associated with the customer. Stated differently, the operator must perform an event communication correlation method to associate the incoming communication event, the customer's phone call, with the customer's account information.

Historically, event communication correlation has been accomplished through the use of outdated and rudimentary techniques. One common method is by oral exchange and confirmation of unique data. For example, the operator may ask for one of several unique keys by which the customer's account information can be retrieved, examples of which include: social security numbers, company specific account numbers, customer addresses, and telephone numbers. The customer orally communicates the unique key to the operator, who manually enters the unique key into a database interface, and when successful, gains access to the customer's account information and can service the call.

Other historical methods of event communication correlation include the use of DTMF tones, ANI data, or caller-id data. DTMF stands for "dual tone multi-frequency" and is more commonly identified by its trademark "TOUCH-TONE." Event communication correlation applications make use of DTMF tones after a telephone call circuit has been established by use of a series of menus or DTMF data entry prompts.

Take for example the same utility company having received a phone call from a customer. Upon connection of the telephone circuit, instead of the customer being placed into a hold queue, the customer is prompted with a pre-recorded spoken message instructing him to select one of several menu options or to enter a unique key by which he may be recognized as a specific customer. The customer presses one or more keys on his telephone, which in turn generates and transmits corresponding DTMF tones that are received and interpreted by a DTMF decoder at the utility company's call center. When the customer correctly responds to the prompts and correctly enters a recognized unique key, such as an account number, the communication event has been "correlated" with the customer's account information.

A company or call center may further employ the use of ANI or caller-id information in an attempt to correlate communication events to additional relevant data. Using this method, a call center captures the customer's telephone number transmitted during the initial moments of the telephone call as caller-id info from a telephone carrier or as ANI information from an ANI service. The captured telephone number is then used as a unique key to correlate the customer's account information with the incoming communication event.

Unfortunately, each of the methods described above are inadequate for the modern needs of event communication correlation. The use of oral confirmation for correlating information is unacceptably slow and inaccurate. The use of DTMF tones is likewise unacceptably slow due the period of time it takes to either manually or automatically input and then transmit the DTMF tones to the DTMF decoder, during which time the customer must wait on the line for the event communication correlation process to complete.

The use of caller-id and ANI information is likewise inadequate as it suffers from a high rate of failure due to the incompatibilities of telecommunication equipment and telecommunication standards used to route a phone call from its origination point to a destination.

Historical wireless telephony devices serve only to exacerbate this problem, because as they "roam" on to foreign or non-preferred networks, they commonly require the use of a temporary telephone number by which they can communicate with destinations or other devices connected via the PSTN. This temporary telephone number causes any attempted event communication correlation process to fail as the temporary telephone number will not be correctly associated with the customer.

Some historical event communication correlation techniques for wireless telephony devices have employed the transmission of "in-band" data over the voice channel as audible signals encoded and transmitted at a wireless telephony device, such as an automobile, and received and decoded at a destination, such as a call center. For example, a historical telephonically enabled automobile can detect an air-bag deployment event and initiate a phone call to a predetermined call center. When the call center receives the phone call, it must correlate the incoming phone call with the appropriate account information related to the automobile in order to service the call. The automobile will then transmit a series of DTMF or other audible tones over the voice channel to the call center, which the call center decodes into identifying information used to properly correlate the phone call with associated account information. Unfortunately, this method of event communication correlation can be time consuming, and prevents voice communication between the call center and the occupants of the vehicle while the audible tones are being transmitted. Meanwhile, the occupants of the vehicle may be injured as the result of a car accident, disoriented, and desperately require help, but the call center cannot provide aid to the occupants until the lengthy in-band event communication process completes.

While telecommunication companies generally transmit the audible portion of a telephone call seamlessly, data describing the communication event, such as ANI and caller-id information, is often lost or corrupted during transmission. Furthermore, methods such as in-band event communication correlation are unacceptably slow for many applications. Because the prior art methods for event communication correlation are slow and unreliable, they are inadequate for modern event communication correlation needs requiring high rates of reliability and minimal delay.

BRIEF DESCRIPTION OF THE DRAWINGS

The claims set forth the embodiments of the invention with particularity. Certain embodiments of the invention, together with its advantages, may be understood from the following detailed description taken in conjunction with the accompanying drawings. Embodiments of the invention are illustrated by way of example and not by way of limitation in the Figures of the accompanying drawings. It should be noted that references to "an," "one," "another," "alternative," or a "particular" embodiment in this disclosure are not necessarily referring to the same embodiment, although they may be, and such references mean at least one embodiment. Reference numerals are utilized herein to identify corresponding components of the Figures described below. Components corresponding to like reference numerals in multiple Figures represent like elements.

DETAILED DESCRIPTION

Figure 1:
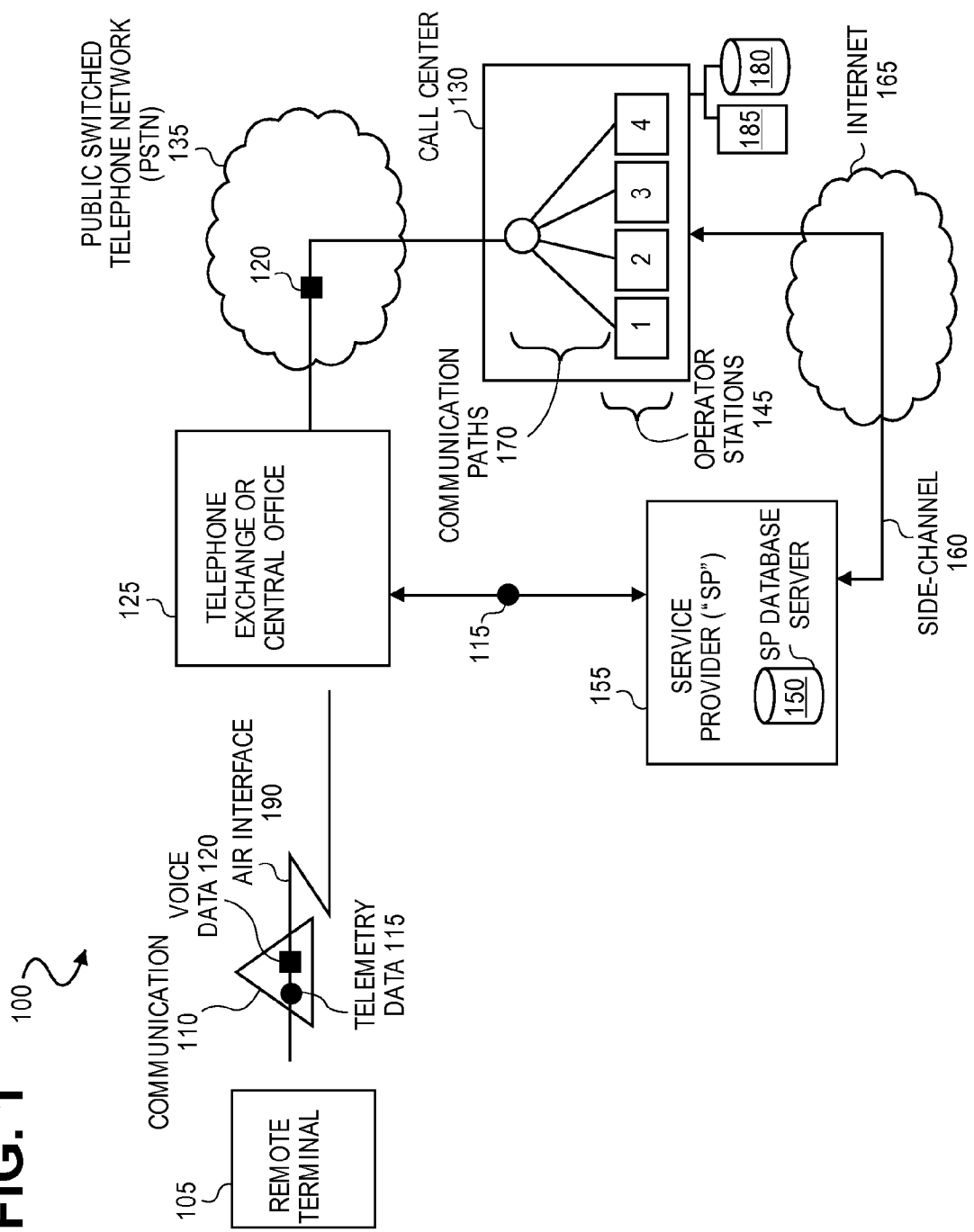
FIG. 1 illustrates a system for correlating incoming event communications with additional relevant information at a call center according to one embodiment of the invention.

The system, devices, and methods described herein are capable of quickly and reliably correlating communication events with additional information pertaining to the remote terminal or a user of the remote terminal, at a call center.

One scenario illustrating such a system is that of a customer driving a telephonically enabled automobile (e.g. the remote terminal). The customer subscribes to a service that provides vehicle monitoring, concierge services, navigation services, emergency assistance services, and vehicle theft recovery services through the use of technology and trained customer service operators. Various events can trigger a communication event, such as a phone call, from the customer's vehicle to the service company, and depending on the type of event, the service company may desire to route the phone call to a different location or to a sub-class of customer service operators that are specifically trained to handle a given type of event.

In one embodiment, the customer suffers a serious automobile accident and is unable to manually trigger a phone call via the automobile's telephonic communication system. The vehicle has an onboard computer connected with several electronic monitoring devices including a global positioning system ("GPS") sensor, an accelerometer, a g-force detector, an airbag deployment detector, and a gyroscopic orientation sensor. Through the sensors the onboard computer determines that an accident has occurred, and automatically triggers a communication, (e.g. a voice call and associated telemetry data) to a default telephone number requesting assistance. The vehicle's onboard computer encodes an event code indicating a car accident, the vehicle identification number ("VIN"), and the default telephone number dialed as telemetry data for transmission with the voice call into the communication.

The automobile transmits the communication to a telephone exchange, which automatically routes the communication to a service provider for dispatch to one of multiple call centers. The service provider analyzes the telemetry data describing the communication and determines that an accident has occurred based on the event code encoded in the telemetry data. The service provider then matches the default number dialed to a call center to receive the voice portion of the communication and sends a message via a side-channel Internet based connection to the matched call center requesting a direct-inward-dial ("DID") telephone number for a customer service station at the call center. The service provider also transmits the telemetry data with the message for use by the call center.

The call center analyzes the message and assigns an operator station based on the contents of the message, including the event code indicating a car accident. The call center then sends a response to the service provider with the DID telephone number for the assigned operator station. The call center also retrieves the customer's account information based on the VIN number encoded in the message and transmits the account information to the assigned operator station for reference by an operator at the operator station.

Meanwhile, the service provider routes the voice portion of the communication directly to the assigned operator station using the DID telephone number, putting the customer in voice communication with the operator at the operator station who was selected automatically based on the operator's specialized training to handle car accidents, as indicated by the event code in the telemetry data. Through use of the event communication correlation system, the customer service operator is contemporaneously presented with information pertaining to the customer's account, retrieved by a server at the call center using the VIN number encoded by the onboard computer at the origination of the communication.

The customer service operator can then telephonically communicate with the customer, and if necessary, transmit information to police or emergency services, including information about the vehicle, the fact that a car accident has occurred, and the identity of the customer. In one embodiment, a vehicle with a GPS sensor encodes the location of the vehicle in telemetry data and the service provider forwards this information to the call center, which in turn provides police or emergency services with a precise location of the vehicle involved in the car accident. In an alternative embodiment, the service provider, redirects the voice portion of the communication from the call center matching the phone number dialed directly to an emergency services provider based on pre-determined routing schemes. The service provider contemporaneously transmits a message comprising the telemetry data, including GPS coordinates, an event code indicating a car accident, and the VIN number to an emergency services provider, thus bypassing the call center dialed by the vehicle entirely.

Figure 4:
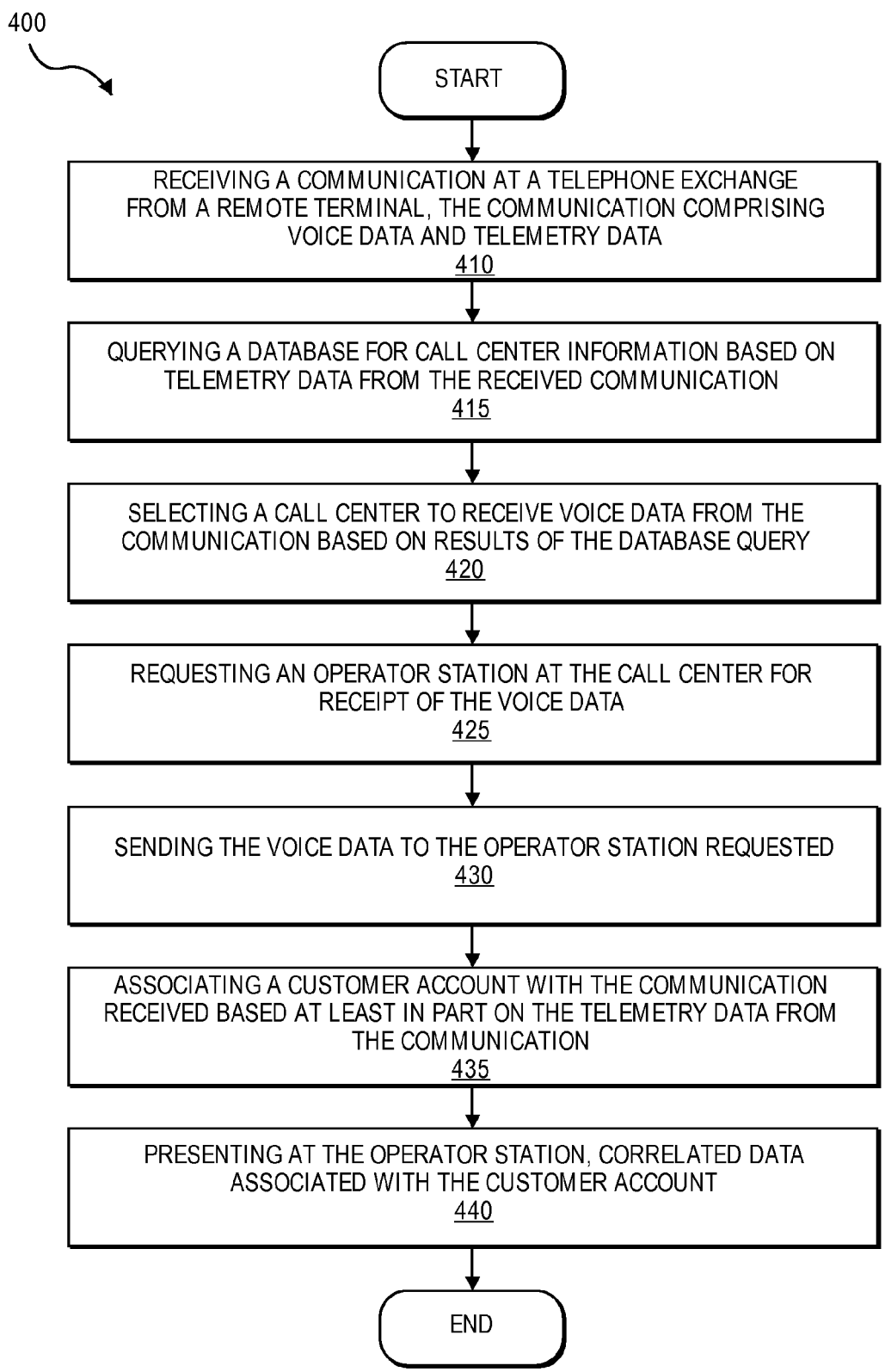
FIG. 4 illustrates a flowchart depicting various steps, some optional, of a method for establishing event communication correlation between a remote terminal and an operator station in accordance with another embodiment of the invention.

Refer now to FIG. 1 and FIG. 4. FIG. 1 illustrates a system 100 for correlating incoming communications 110 with additional relevant information at a call center 130 according to one embodiment of the invention. FIG. 4 depicts a flowchart of various steps implementing some elements of FIG. 1.

Remote terminal 105 transmits communication 110 to telephone exchange 125 via air interface 190. Communication 110 contains telemetry data 115 and voice data 120. Telephone exchange 125 is communicatively connected with service provider ("SP") 155, which in turn is connected with call center 130 through side-channel 160, an Internet based connection 165. Telephone exchange 125 is separately communicatively connected with call center 130 via public switched telephone network ("PSTN") 135. SP 155 contains SP database server 150 used to route communication 110 to call center 130 and further used to correlate communication 110 with additional information available from server 185 and database 180, both accessible from call center 130. Call center 130 comprises operator stations 145(1-4), each individually accessible from PSTN 135 via communication paths 170, which are each communicatively connected with PSTN 135.

Figure 2:
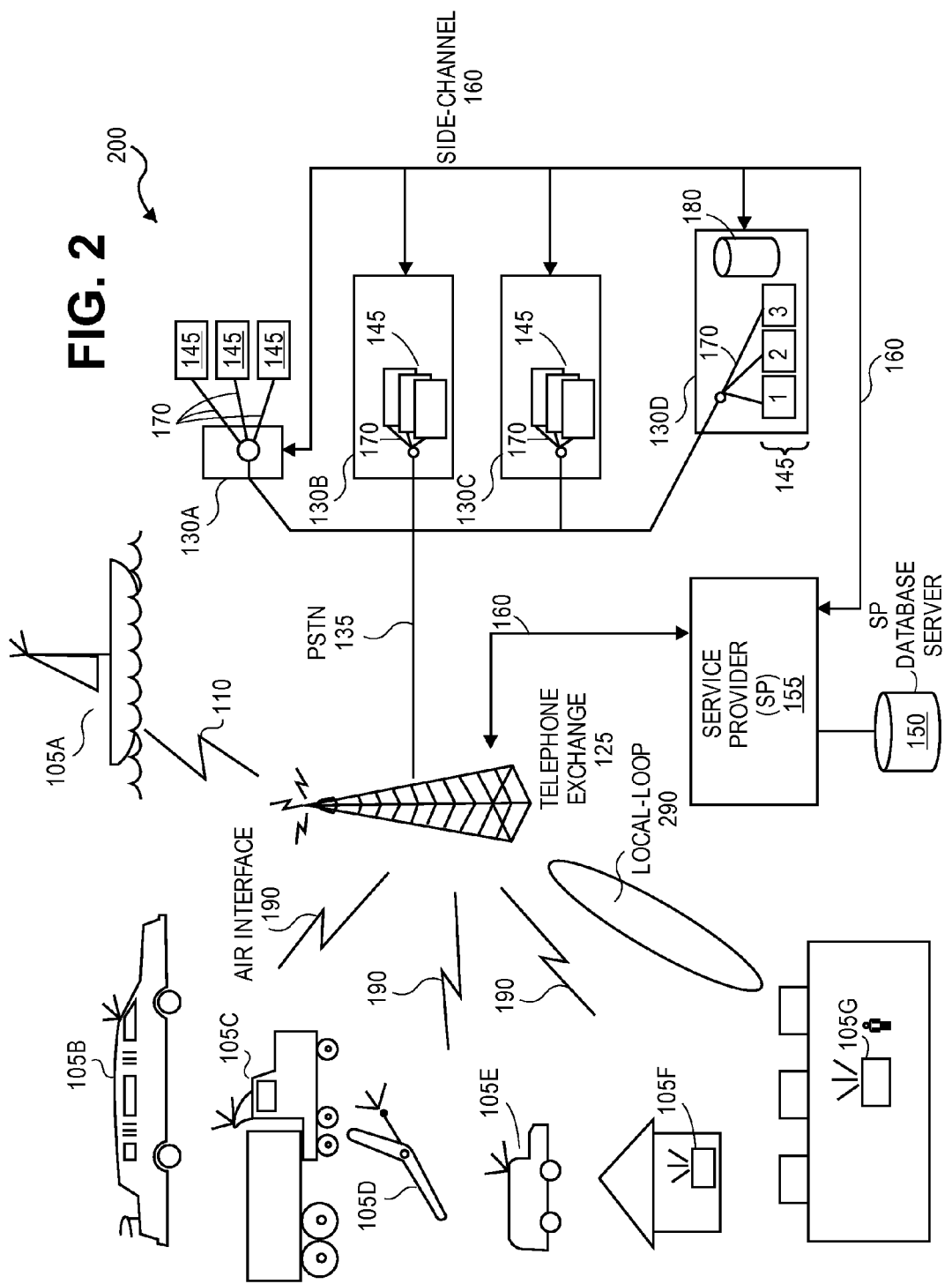
FIG. 2 illustrates several remote terminals capable of monitoring events, or creating event codes, or both, and initiating a communication event that is correlated with additional relevant information at one of many call centers according to a particular embodiment.

Remote terminal 105 can transmit communication 110 to telephone exchange 125 via wireless communication mediums such as air interface 190 or wired communication mediums such as local loop 290 of FIG. 2. The communication standards used to transmit the voice data 120 portion of communication 110 may be of any wired or wireless voice transmission protocol including CDMA (code division multiple access) signals, GSM (Global System for Mobile Communications) signals, AMPS (Advanced Mobile Phone System) signals, TDMA (Time division multiple access) signals, satellite signals, or land-line telephone technology using twisted-pair, coax, or fiber optic mediums.

Voice data 120 can be audible sounds, tones, or voice for transmission with the communication 110. In one embodiment, voice data 120 is an analog signal representing spoken communication originating from a user of remote terminal 105. In this embodiment, the user's voice and other sounds from the surrounding environment are detected by remote terminal 105 and encoded in the communication 110 as voice data 120. In another embodiment, voice data 120 is a digital signal representing sound detected by remote terminal 105 and embedded into communication 110 as voice data 120.

Telephone exchange 125 is capable of receiving communication 110 from remote terminal 105 (step 410). In one embodiment telephone exchange 125 is a circuit switch on PSTN 135. In another embodiment, telephone exchange 125 is a wireless antenna enabled to receive communications 110 from cellular telephones and other wireless devices compatible with CDMA, GSM, AMPS, or TDMA wireless communication protocols and further enabled to communicate with the PSTN 135. In yet another embodiment, telephone exchange 125 is a communications satellite ("comsat") receiver that receives communication 110 from remote terminal 105, and forwards communication 110 to SP 155, or PSTN 135, or both. Telephone Exchanges 125 are sometimes referred to as "central offices," "exchanges," or "branches," "carriers," a "Mobile Switching Center (MSC)," a "carrier switch," a "cell tower," or some combination, but in essence, is the interface between communication devices, such as remote terminal 105 and other devices available on the public switched telephone network 135.

Telephone exchange 125 can send an acknowledgement message to remote terminal 105 confirming receipt of communication 110. Alternatively, SP 155 can send the acknowledgement message, or in some embodiments both telephone exchange 125 and SP 155 will send an acknowledgement message to remote terminal 105. Similarly, SP 155 may send an acknowledgement message to telephone exchange 125 confirming receipt of telemetry data 115, or a hold on voice data 120 while telephone exchange 125 performs routing functions. In some embodiments, Telephone exchange 125 can send a single acknowledgement confirming both telemetry data 115 and voice data 120 in the form of an acknowledgment to communication 110.

Service Provider 155 can be integrated with telephone exchange 125 into one machine or location, or operate separately from it as shown. In some embodiments, multiple service providers 155 are used in conjunction with one or more telephone exchanges 125. In other embodiments, service providers 155 are paired with an equal number of telephone exchanges 125. SP 155 can be an application executing on a generic hardware platform, or it can be dedicated hardware and firmware, or some combination of these. SP 155 provides sophisticated routing of communication 110 through the use of pattern matching, regular expression, positional character pattern matching, or other analysis on information provided by remote terminal 105 and telephone exchange 125 to describe communication 110 in the form of telemetry data 115.

Telemetry data 115 includes such things as serial numbers of the originating remote terminal 105, location of the telephone exchange 125 receiving communication 110, or event codes indicating the reason for the communication 110. Telemetry data 115 originates at remote terminal 105 and is transmitted to telephone exchange 125 via wired or wireless mediums. The wired or wireless messaging protocol or standard used may be any of well known protocols known in the art, such as Short Message Delivery Point-to-Point (SM-DPP), Short Message Peer to Peer (SMPP), Microburst™ technology, ANSI-41, GSM Mobile Application Part (MAP) signals, Short Message Service (SMS), ANSI 2000 compatible Code Division Multiple Access (CDMA) messaging protocols, General Packet Radio Service (GPRS) protocol, Universal Mobile Telecommunications System (UMTS) protocol, High-Speed Downlink Packet Access (HSDPA), and any other means of transmission for telemetry data 115, including encoding the telemetry data 115 into fields of an overhead control channel signal between a transmitter and a receiver. Telephone exchange 125 may encode additional information known only to it into telemetry data 115 before forwarding the telemetry data 115 on to service provider 155 via wireless or wired communication mediums.

SP 155 can communicate with multiple incompatible telephony networks within PSTN 135, acting as a translator or a communications gateway. SP 155 can intercept, capture, hold, or delay the voice data 120 portion of a communication while it determines which call center 130 or which operator station 145 at a call center 130 is to receive the voice data 120 portion of communication 110. This delay is normally no more than a few seconds and can include time-to-live request functionality that triggers fall-back logic should SP 155 be unable to route communication 110 according to its most preferred routing scheme.

SP 155 can assign a Temporary Location Directory Number (TLDN) to remote terminal 105 if it is "roaming" on a foreign network or uses an incompatible address or phone number, such as a Mobile Identification Number (MIN) or an International Mobile Subscriber Identity (IMSI) that cannot be connected to a call center 130 via PSTN 135. In one embodiment, remote terminal transmits the telemetry data 115 portion of communication 110 first and SP 155 determines that a TLDN is required for telephone exchange 125 to transmit the voice data 120 portion of communication 110 to a call center 130. SP 155 then assigns a TLDN to remote terminal 105, sends the TLDN to remote terminal 105 via telephone exchange 125, and remote terminal 105 then uses the TLDN to transmit the voice data 120 portion of communication 110 to telephone exchange 125, where SP 155 can then route the communication 110 accordingly. SP 155 further has access to algorithms, routing information, and data analysis instructions via database 150 used to cross reference incoming communication 110 with potential call centers 130.

In one embodiment, SP 155 intercepts communication 110 through telephone exchange 125 and replaces the original routing information, such as the destination telephone number, with routing information pulled from database 150 (step 415), then forwards communication 110 to PSTN 135 via telephone exchange 125 where it is then routed by PSTN 135 to call center 130 as specified by SP 155. In another embodiment remote terminal 105 is a cell phone and communication 110 is routed by a destination telephone number transmitted from remote terminal 105, such as an alphanumeric code or sequence, and stored in telemetry data 115. Telephone exchange 125 receives communication 110 and forwards it to SP 155. SP extracts the destination telephone number from telemetry data 115, queries database 150 for a match using the destination telephone number as a search parameter, and modifies the destination telephone number in the telemetry data 115 with the results from the database 150.

In a particular embodiment, when SP 155 queries database 150 and a match is not found in database 150, SP 155 forwards communication 110 to the originally specified destination based on the telemetry data 115 (step 420). In another embodiment, SP 155 receives communication 110 from telephone exchange 125 and analyzes routing information contained in telemetry data 115 using regular expression pattern matching, and when a match is found, modifies the routing information. When a match is not found, SP 155 forwards the communication 110 to its original destination.

SP Database server 155 can be a server/database combination machine, multiple machines, or software to realize the functions of a database repository and a server capable of executing instructions and logic. SP database server 155 may be referred to as a server, as a database, or as a database server. SP database server 155 can store a mapping of telephone numbers associated with call centers 130 to Internet addresses, such as IP addresses or uniform resource locator ("URL") addresses for servers 185 and databases 180 associated with call centers 130. SP database server 155 can also store a mapping of telephone number ranges associated with call centers 130 to internet addresses, or alphanumeric strings or sequences mapped to internet addresses for call centers 130. In one embodiment, SP 155 retrieves an internet address for call center 130 based on an alphanumeric code contained within telemetry data 115, and then initiates machine-to-machine ("M2M") communications with the server 185 connected with destination 130 over side-channel 160 located at the internet address retrieved.

SP 155 may expedite communications 110 through the use of direct-inward-dial ("DID") telephone numbers that specify communication paths 170 for specific operator stations 145 connected with a given call center 130. In one embodiment, instead of communication 110 arriving at call center 130 and being placed into a hold queue to await the next available operator station 145, SP 155 routes the voice data 120 portion of communications 110 directly to a specific operator station 145, bypassing the call center's 130 hold queue. In another embodiment, SP 155 sends a message to call center 130 requesting a communication path 170 describing a direct-inward-dial path ("DID path") or a DID phone number that routes through a private branch exchange (PBX) to one of many operator stations 145 connected with call center 130 (step 425). Call center 130 assigns operator station 145(3) to receive communication 110 and returns communication path 170 describing a DID phone number or DID path to operator station 145(3) (step 430). SP 155 then forwards the voice data 120 portion of communication 110 directly to operator station 145(3) over communication path 170 using the DID phone number, thus bypassing the call center 130 hold queue entirely.

SP 155 can perform different actions on incoming communications 110. For example, in one embodiment, SP 155 queries database 150 for a call center 130 to receive communication 110, and when SP 155 does not find a match, SP 155 engages one of several fall-back instructions. A first fall-back instruction forwards communication 110 to a phone number dialed by remote terminal 105. In another embodiment, SP 155 finds a matching call center 130 to receive communication 110, sends a message to call center 130 requesting a DID phone number, and when a response is not received within a predetermined amount of time, SP 155, via a second fall-back instruction forwards communication 110 to a default telephone number listed in database 150, different from the phone number dialed by remote terminal 105. In a particular embodiment, SP 155 sends a message requesting a DID phone number to multiple matching call centers 130, and forwards communication 110 to the first call center 130 to respond to the request. In yet another embodiment, SP 155 sends a message to multiple call centers 130 and selects which call center 130 to forward communication 110 to from multiple responses received in a finite amount of time based on data in the response, such as a call center 130 priority code, or a destination utilization percentage.

SP 155 can route communication 110 to different call centers based on information encoded in telemetry data 115. For example, in one embodiment, all communications 110 having an event code indicating an emergency are forwarded to a call center 130 operated by an emergency services provider, such as a fire department, a police station, an ambulatory service, or the United States Coast Guard. SP 155 can forward communication 110 to a call center 130 based upon a location provided by telephone exchange 125. For example, in one such embodiment, SP 155 maintains a list of all police station call centers 130 in the United States, including their respective phone numbers describing communication paths 170 to each police station call center 130. SP 155 receives communication 110 and selects a police station call center 130 to receive the voice data 120 portion of communication 110 based on the physical proximity of the police station call center 130 to the telephone exchange 125 location.

In one embodiment, SP 155 modifies the routing information for communication 110 and forwards only voice data 120 to the selected operator station 145, discarding telemetry data 115. In another embodiment, SP 155 forwards a portion of telemetry data 115 to call center 130 via side-channel 160, and forwards voice data 120 to an operator station 145 via PSTN 135. In yet another embodiment, SP 155 sends a message containing portions of telemetry data 115 to server 185 accessible via call center 130 requesting a communication path 170 to a single operator station 145 at the call center 130. Server 185 assigns operator station 145(1) based on the message containing portions of the telemetry data 115, and returns destination path 170 for operator station 145(1) to SP 155, after which SP 155 forwards voice data 120 directly to operator station 145(1) via communication path 170.

Service provider 155 can send messages to call center 130 and receive responses from call center 130 via side-channel 160. Side-channel 160 can be a data connection between the call center 130 and the SP 155 provided by an internet service provider ("ISP") as shown in FIG. 1, or a digital network connection on a local area network ("LAN"), a connection on a secured intranet, a tunneling virtual private connection ("VPN"), an encrypted network connection over a public data network, such as a secure sockets layer ("SSL") connection, or any other connection enabling the SP 155 to send and receive data to and from call center 130, or server 185 and database 180 at call center 130. For example, in one embodiment SP 155 maintains a permanent connection to the internet 165 through an ISP and transmits messages and receives responses from call center 130 over the side-channel 160 internet connection 165.

SP 155 receives communications 110 from the telephone exchange 125, but is not the destination for the voice data 120 portion of communication 110 originating from remote terminal 105, and must therefore forward the voice data 120 portion of communication 110 to a call center 130. Side-channel 160 is not suitable for transmitting voice data 120 to call center 130, despite its use for transmitting portions of telemetry data 115 inside of messages to call center 130. While some voice communication similar to voice data 120 may traverse portions of the internet 165 in route to call centers 130 through the use of voice over internet protocol ("VoIP") technology, a large portion of such transmissions require the use of PSTN 135 or similar carriers as many call centers 130 are not equipped to receive VoIP transmissions. Therefore, when SP 155 determines which call center 130 to route voice data 120 to, PSTN 135 is used to transmit voice data 120 to its call center 130 and not side-channel 160.

In one embodiment, PSTN 135 links traditional land-line telephones with multiple telephone carriers, and further links cellular telephone carriers to traditional land-line phones through the use of telephone exchanges and telecommunication gateways. PSTN 135 may be comprised of many telephony networks each operated by a telecommunications company such as the traditional land-line "baby-bells," or modern cellular providers, and more recently other non-traditional carriers such as Comcast Cable who now offers land-line telephony services. Each telephony network within PSTN 135 is capable of transmitting voice data 120 between networks, but is unable to transmit telemetry data 115 between networks, without the use of service provider 155, due to incompatible technologies. In a particular embodiment, PSTN 135 is a telephone network of a foreign country having a connection with PSTN 135, capable of receiving voice data 120 transmissions from SP 155, or telephone exchange 125, or both.

In one embodiment, SP 155 forwards voice data 120 to a call center 130 in the country of India over a public international telecommunication network via PSTN 135. In another embodiment, SP 155 forwards voice data 120 to a call center call center 130 in the U.S. state of Kentucky via PSTN 135. PSTN 135 is not suitable for transmitting telemetry data 115 to call center 130, despite its use for transmitting voice data 120 to call center 130. Therefore, when SP 155 forwards communication 110 to call center 130, PSTN 135 is used to transmit voice data 120 and side-channel 160 is used to transmit telemetry data 115.

PSTN 135 is connected with communication paths 170 at call center 130. Communication paths 170 can provide a direct communication path to each operator station 145 connected with call center 130 without the need to separately use extensions, hold queues, or DTMF activated menus. For example, in one embodiment operator station 145(2) is accessible externally from call center 130 by dialing a U.S. direct-inward-dial ("DID") telephone number, which is routed to a communication device or a telephone at operator station 145 (2). In another embodiment, SP 155 forwards voice data 120 directly to operator station 145(4) in the country of Brazil through the use of a communication path 170 uniquely associated with operator station 145(4) without operator assistance or transmitting DTMF codes.

Call center 130 can make use of server 185, or database 180, or both, each accessible from call center 130. When call center 130 receives a message from SP 155 via side-channel 160, call center 130 may use server 185 to receive and respond to the message. In one embodiment server 185 receives a message from SP 155 requesting a communication path 170 to one of many operator stations 145 at call center 130. Server 185 tracks the availability of operator stations 145 at call center 130 and assigns available operator station 145(1) to receive incoming voice data 120. Server 185 sends a response to SP 155 indicating the communication path 170 for operator station 145(1) and SP 155 forwards voice data 120 to operator station 145(1) via PSTN 135 specifying a route based on communication path 170. In an alternative embodiment, SP 155 retrieves communication path 170 from database 180 through its own database query, and then forwards voice data 120 to call center 130 via the retrieved communication path 170.

Turning now to FIG. 2 depicting several remote terminals 105(A-G) capable of monitoring or creating events and initiating a communication 110 that is correlated with additional relevant information at a call center 130 according to an embodiment of the invention. Remote terminals 105(A-G) each transmit communications 110 to telephone exchange 125 either wirelessly or via hard-wire via air interfaces 190 and local-loops 290 respectively. Telephone exchange 125 is communicatively connected with call centers 130(A-D) through side-channel 160 and is further communicatively connected with call centers 130(A-D) via separate PSTN 135. PSTN 135 links telephone exchange 125 with a communication path 170 to each operator station 145 located at one of call centers 130(A-D). SP 155 is connected between telephone exchange 125 and call centers 130(A-D) via side-channel 160. SP 155 has access to both database 150 and database 180 accessible via call center 130D.

Remote terminals 105(A-G) can be application specific and designed to operate uniquely in a specific environment. SP 155 and call centers 130(A-D) can customize routing of voice data 120 to various call centers 130(A-D) and operator stations 145 based on telemetry data 115 originating from remote terminals 105(A-G). Remote terminals 105(A-G) may further contain or be connected with sensors, event detectors, or computers that provide additional information to the remote terminal 105(A-G) for transmission with communications 110. Remote terminals 105(A-G) may encode additional information from sensors, event detectors, or computers into telemetry data 115.

For example, in one embodiment remote terminal 105A is a telephonically enabled apparatus for use in marine or aquatic applications. When SP 155 captures or receives communication 110 originating from remote terminal 105A, SP 155 forwards voice data 120 to a United States Coast Guard call center 130A or to an alternate call center 130B depending on telemetry data 115 transmitted with communication 110. In another embodiment, remote terminal 105B is installed into an ultra-luxury automobile, such as a Roles-Royce BMW™ or a Maybach Mercedes-Benz™. Upon intercepting communication 110 originating from 105B, SP 155 determines the specific make and model of the vehicle based on a vehicle identification number ("VIN") embedded in telemetry data 115, looks up which call center 130 services that particular make and model of vehicle, and forwards voice data 120 to call center 130D which exclusively handles high-value clientele driving Roles-Royce and Maybach automobiles.

Similarly, SP 155 can detect based on a unique device serial number of remote terminal 105C encoded into telemetry data 115 that communication 110 is coming from a tractor-trailer or semi-truck and route the call accordingly. Service provider 155 can likewise analyze telemetry data 115 encoded by a common wireless telephone 105D, an onboard vehicle communication remote terminal 105E, a security alarm system telephone device 105F, a heating ventilation and air conditioning ("HVAC") monitoring station 105G, and from a wide array of other wired or wireless remote terminals 105(A-G).

Service provider 155 can determine which of many call centers 130(A-D) are to receive the voice data 120 portion of communication 110 based on predetermined information stored in database 150, information encoded in telemetry data 115, or information provided by telephone exchange 125. Similarly, each call center 130(A-D) can determine which operator station 145 among a plurality of operator stations 145 will be assigned to receive the voice data 120 portion of communication 110 via an associated communication path 170. Operator stations 145 can be located inside of a call center 130, or may be located remotely from a call center 130, but connected with it. For example, in one embodiment, operator stations 145 are located inside of employees' homes and connection path 170 connects each operator station 145 with call center 130, as shown in FIG. 2, operator station 130A. In another embodiment, operator stations 145 are located inside of a call center 130 and each operator station 145 is connected via connection path 170 through a local PBX (private branch exchange) terminal. In yet another embodiment, operator stations 145 are located in a foreign country but connected with a dispatch office call center 130 located in the United States via communication paths 170 and communications 110 or voice data 120 forwarded to the communication path 170 arrives seamlessly at the associated operator station 145 without the use of extensions, hold queues, or DTMF tones.

Figure 3:
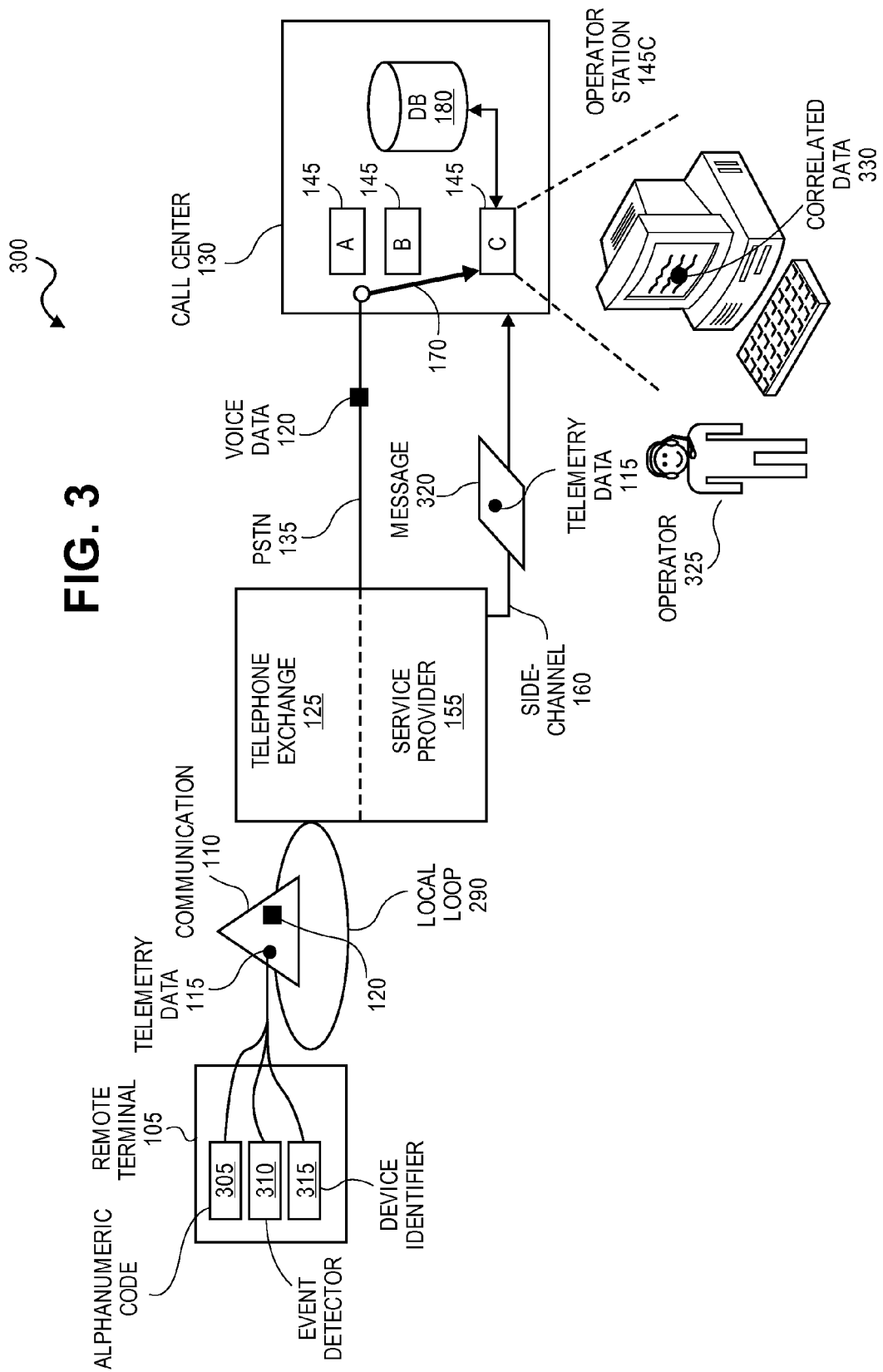
FIG. 3 illustrates an alternative view of a system having a remote terminal to encode telemetry data into a communication for transmission to a call center where additional relevant information is associated with the communication and represented at an operator station based on the telemetry data according to a particular embodiment.

Refer now to FIG. 3 and FIG. 4. FIG. 3 illustrates an alternative view of a system 300 having remote terminal 105 to encode telemetry data 115 into communication 110 for transmission to call center 130 where additional relevant information is associated with communication 110 and presented to an operator station 145. Remote terminal 105 contains an alphanumeric code 305, event detector 310, and device identifier 315. Remote terminal 105 encodes information from the alphanumeric code 305, event detector 310, and device identifier 315 into telemetry data 115 for transmission with communication 110 to telephone exchange 125. Voice data 120 is contemporaneously transmitted by remote terminal 105 as part of communication 110. SP 155, integrated with telephone exchange 125, sends message 320 to call center 130 via side-channel 160. Message 320 contains some or all of telemetry data 115 transmitted with communication 110. Telephone exchange 125 is communicatively connected with call center 130 via PSTN 135, and further connected with operator stations 145(A-C) inside of call center 130 via communication paths 170 linking each operator station 145 to PSTN 135. Call center 130 further contains database 180, which is connected with operator station 145C. Operator station 145C is associated with operator 325. Operator station 145C displays a representation of correlated data 330 obtained from database 180.

Remote terminal 105 can encode information accessible by remote terminal 105 into the telemetry data 115 for later use by the SP 155 in routing the voice data 120 and by the call center 130 in correlating communication 110 communication events with correlated data 330 for representation on an operator station 145. Information encoded into telemetry data 115 can be forwarded to call center 130 by SP 155 in the form of a message 320, over side-channel 160. When call center 130 receives message 320, it can assign one operator station 145 (A-C) to receive voice data 120 based on the content of message 320, and return communication path 170 to SP 155 describing the operator station 145(A-C) assigned. SP 155 can also forward voice data 120 directly to the assigned operator station 145 using communication path 170 provided by call center 130. Message 320 can contain time-to-live information providing the call-center 130 with a time-limit after which point SP 155 will engage a fall-back or alternate less preferred routing scheme.

Information that remote terminal 105 encodes into telemetry data 115 may come from a variety of sources. FIG. 3 illustrates some of those sources labeled alphanumeric code 305, event detector 310, and device identifier 315.

Alphanumeric code 305 for example, can be any sequence of numbers, symbols, or characters input into remote terminal 105. In one embodiment, alphanumeric code 305 is a toll free telephone number associated with a call center, such as a United States toll free telephone number beginning with a prefix of 800, 888, 866, etc. In another embodiment, alphanumeric code 305 is a unique code transmitted from the remote terminal 105 to the telephone exchange 125 via telemetry data 115, such as dialing "6-1-1" or "*-2" to connect with a wireless telephone carrier directly, bypassing the PSTN 135, or "*-6-9," pronounced "star-six-nine," transmitted from a hard-wired land-line telephone to reconnect with the last incoming communication from another device. In yet another embodiment, a short message entered into, or stored at remote terminal 105, such as "h-e-l-p," or "S-O-S," or "9-1-1" can be encoded by remote terminal 105 into telemetry data 115 and used by SP 155 to route communication 110 to a call center 130 associated with the string, such as an emergency services provider. One call center 130 may wish to service communications 110 with the string "f-o-o-d" encoded into the telemetry data, anticipating the communications 110 are requests for restaurant concierge services.

Event detector 310 can be a sensing device internal to remote terminal 105 itself, or can be an interface with another computer or device capable of capturing or generating information and providing the information to event detector 310 as input. For example, in one embodiment, event detector 310 is installed into a vehicle, such as remote terminal 105E of FIG. 2. In this embodiment, event detector 310 has a global positioning system ("GPS") sensor, an accelerometer, an airbag deployment detector, a gyroscopic vehicular orientation sensor, and a crash detection computer that inputs data from the sensors into event detector 310. In another embodiment event detector 310 is installed into a marine application, such as remote terminal 105A of FIG. 2, and comprises a yaw, pitch, and roll detector, a water pressure gauge, a salinity sensor, and a thermostat.

In yet another embodiment, event detector 310 comprises sensors to detect vehicle fuel efficiency, vehicular speed, and a vehicle odometer interface for use in a tractor-trailer such as remote terminal 105C of FIG. 2. In a particular embodiment, remote terminal 105F of FIG. 2 is used in a security system and event detector 310 comprises an alarm state sensor, multiple entry point sensors capable of detecting open and shut positions of doors and windows, a smoke detection sensor, a carbon monoxide sensor, a temperature sensor, and a humidity sensor. In an alternative embodiment, event detector 310 is installed into remote terminal 105G of FIG. 2 for use in heating ventilation and air conditioning ("HVAC") monitoring and comprises sensors including a motor load sensor, an air particulates sensor, a temperature sensor, a humidity sensor, an air flow sensor, an interior air pressure sensor, and multiple HVAC unit operating state sensors. Sensor information encoded into telemetry data 115 can be used by SP 155, call center 130, or operator stations 145, or both in routing manual or automated communications 110 from remote terminals 105 to particular call centers 130 or operator stations 145, or both.

Device identifier 315 may be used to encode information stored on remote terminal 105 into telemetry data 115 for later use in uniquely identifying a particular remote terminal 105, determining the type of the remote terminal 105, or for associating correlated data 330 with a communication 110 originating from remote terminal 105. In one embodiment, device identifier 315 comprises a MIN (mobile identification number) that remote terminal 105 encodes into telemetry data 115 for transmission with communication 110. In another embodiment, device identifier 315 comprises an IMSI (International Mobile Subscriber Identity) number, or an ESN (Electronic Serial Number) for a mobile device. In a particular embodiment, device identifier 315 comprises a VIN (vehicle identification number) for an automobile. In yet another embodiment, device identifier 315 stores an originating phone number for a land-line remote terminal 105, such as a telephone and hand-set, connected with PSTN 135. In an alternative embodiment device identifier 315 comprises a MAC (medial access control) address number for devices comprising an Ethernet interface, or a device serial number that uniquely identifies an electronic remote terminal 105.

Device identifiers 315 can be passed to call centers 130 by SP 155 in messages 320. Call centers 130 may use device identifiers 315 or information supplied by a device identifier 315 to retrieve correlated data 330 from a SP database server 150 and database 180 or from other data repositories. For example, in one embodiment, call center 130 receives device identifier 315 comprising a VIN and queries database 180 using the VIN to retrieve correlated data 330. In another embodiment, call center 130 receives device identifier 315 comprising an ESN and retrieves correlated data 330 based on the ESN.

Correlated data 330 can be any information capable of being stored in a database 150 and 180, data repository, or other storage medium and retrievable through use of information encoded into communications 110 by device identifier 315. For example, in one embodiment, correlated data 330 is customer account information (step 435). In another embodiment, correlated data 330 is a person's medical history, retrieved by call center 130 when SP 155 sends message 320 related to a communication 110 from a medical alert remote terminal 105. In a particular embodiment, correlated data 330 comprises the entertainment preferences associated with the user of remote terminal 105, including favorite restaurants, favorite foods, disliked foods, preferred spending range for dining, preferred aircraft seating, preferred sporting events, private memberships, and so on. In an alternative embodiment, correlated data 330 includes security passwords, authorized persons for a premises, emergency client contact numbers, and pre-arranged distress codes, all for use with a communication 110 related to a security remote terminal 105, such as remote terminal 105F of FIG. 2.

Telephone exchange 125 can encode information into telemetry data 115 when it interfaces communications 110 between remote terminal 105 and SP 155. Telephone exchange 125 may encode a unique telephone exchange 125 identifier, a timestamp, a telephone exchange 125 location code, a communication 110 priority code, or a remote terminal 105 location code describing the estimated location of remote terminal 105 based on triangulation estimates using data from telephone exchange 125 and surrounding telephone exchanges 125. In one embodiment, telephone exchange 125 encodes a cell-tower ID and stored GPS coordinates for its location.

Information encoded into telemetry data 115 by telephone exchange 125 may be used by a call center 130 receiving communication 110 to better assist a user associated with the remote terminal 105 originating the communication 110. For example, in one embodiment, information encoded into telemetry data 115 by telephone exchange 125 is used by SP 155 to choose a call center 130 to receive voice data 120. In an alternative embodiment, SP 155 forwards information encoded into telemetry data 115 by telephone exchange 125 to a default call center 130, and call center 130 uses the information to determine which operator station 145 is assigned to receive voice data 120.

Call center 130 can receive message 320 from SP 155 requesting a communication path 170 for use in forwarding voice data 120 to an operator station 145 at call center 130, thus bypassing a call center 130 hold queue otherwise used for incoming voice data 120 not assigned to an operator station 145. Call center 130 may send an acknowledgement to SP 155, or may generate a response to the message 320 and transmit the response back to SP 155. Call center 130 may assign operator stations 145 to accept incoming voice data 120 on a random basis, on a round-robin basis, or by other arbitrary means. Call center 130 however, can also use sophisticated selection techniques to assign operator stations 145 to accept incoming voice data 120 based on message 320 received from SP 155.

For example, in one embodiment, call center 130 services clients having remote terminal 105 installed in a vehicle. Call center 130 receives message 320 from SP 155 requesting an operator station 145 and destination path 170 to forward voice data 120 to. Call center 130 analyzes message 320 and determines, based on information supplied originally from event detector 310 that communication 110 is related to a car accident. Call center 130 queries database 180 for an operator station 145 associated with an operator 325 trained specifically to deal with clients involved in a car accident. Call center 130 determines that operator station 145C meets this criterion, and sends SP 155 a response comprising communication path 170 leading directly to operator station 145C. SP 155 then forwards voice data 120 to operator station 145C using communication path 170.

In an alternative embodiment, call center 130 determines, based on message 320, that incoming voice data 120 is related to a concierge request. Call center 130 has two groups of customer service operators, those trained to service general customers, and those trained to service high-value customers who pay additional service fees for extra benefits and services. Call center 130 analyzes message 320 and determines, based on the device identifier 315 originally encoded by remote terminal 105, that communication 110 should be routed to an operator station 145 associated with an operator 325 trained to service high-value customers.

Call center 130 can retrieve correlated data 330 from database 180 based on received message 320 and forward the correlated data 330 to the operator station 145 assigned to receive voice data 120. Operator station 145 may be a computer and telephone in a call center, a headset and computer display in an ambulance, police car, or helicopter, or a handheld radio and a portable electronic device on a marine vessel. When call center 130 assigns an operator station 145 to receive voice data 120, it can transmit correlated data 330 to the assigned operator station 145 (step 440) so that both correlated data 330 and voice data 120 arrive at the assigned operator station 145 within a few seconds of each other.

For example, in one embodiment, call center 130 assigns operator station 145C to receive incoming voice data 120 based on message 320 from SP 155. Call center 130 sends communication path 170 to SP 155, and retrieves correlated data 330 from database 180 based on the serial number for remote terminal 105 encoded in message 320. Call center 130 transmits correlated data 330 to operator station 145C and SP 155 forwards voice data 120 to operator station 145C via communication path 170 within zero to fifteen seconds of the arrival of correlated data 330 at operator station 145C. In another embodiment, call center 130 notifies operator station 145C that voice data 120 is coming, and operator station 145C retrieves correlated data 330 from database 180 itself, based on the content of message 320.

In some embodiments, call center 130 may request updated or additional telemetry data 115 from SP 155. The updated or additional telemetry data 115 may be available from remote terminal 105, telephone exchange 125, SP 155, or SP database server 150. In an alternative embodiment, SP 155 may pass a telephone number for remote terminal 105 to call center 130 at which point call center 130 may initiate an outgoing voice data 120 connection with remote terminal 105 via operator station 145 over PSTN 135 should the voice data 120 portion of communication 110 received by telephone exchange 125 and SP 155 be lost, disconnected, or severed.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine, such as remote terminal 105 that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

Aspects of the processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions.

In the foregoing specification, the invention has been described with reference to specific exemplary embodiments thereof. It will, however, be evident that various modifications and changes may be made thereto without departing from the broader spirit and scope of the invention as set forth in the appended claims. For example, an IMSI may be used instead a MIN depending upon which region or country that the remote terminal 105 is operating in. The specification and drawings are, accordingly, to be regarded in an illustrative rather than a restrictive sense.

Thus, a system 100 and 300, method 400, and devices 200 for correlating communication events with additional relevant information at a call center 130 has been disclosed. Use of the disclosed event communication correlation systems may result in the ability for a call center 130 or similar entities to provide enhanced service to their customers. Use of the disclosed systems may further result in the ability for an intermediary service provider 155 to redirect communications 110 to alternative call centers 130 based on telemetry data 115 encoded by a remote terminal 105 or telephone exchange 125. Use of the disclosed systems can also be used by a call center 130 to specify a communication path 170 or a DID telephone number to a particular operator station based on the type of incoming communication 110 thus bypassing traditional hold queues, DTMF systems, manual routing, and extensions.

What is claimed is:

1. A method at a service provider comprising:
receiving one or more communications from a remote terminal, transmitted to the service provider via a telephone exchange, wherein each communication comprises telemetry data and voice data;
selecting a call center from a plurality of call centers to receive a communication, wherein selecting the call center is based at least in part on the telemetry data;
sending a message to the call center over a side-channel, the message comprising at least a portion of the telemetry data, and further comprising a request for a communication path to one of a plurality of operator stations connected with the call center; and
sending the voice data to the one operator station over a public switched telephone network (PSTN) connection via the communication path requested.

2. The method of claim 1, wherein receiving the one or more communications from the remote terminal comprises receiving the telemetry data from the remote terminal via a wireless messaging protocol.

3. The method of claim 2, wherein receiving the one or more communications from the remote terminal further comprises receiving the voice data from the remote terminal via a wireless voice transmission protocol.

4. The method of claim 3, wherein receiving the one or more communications from the remote terminal further comprises receiving the telemetry data and the voice data of each communication independently.

5. The method of claim 4, wherein the wireless messaging protocol comprises one of Short Message Delivery Point-to-Point (SMDPP) protocol, Short Message Peer to Peer (SMPP) protocol, MICROBURST, ANSI-41, GSM Mobile Application Part (MAP) protocol, Short Message Service (SMS) protocol, ANSI 2000 compatible Code Division Multiple Access (CDMA) messaging protocols, General Packet Radio Service (GPRS) protocol, Universal Mobile Telecommunications System (UMTS) protocol, High-Speed Downlink Packet Access (HSDPA), and an overhead control channel encoding compatible protocol, and wherein the wireless voice transmission protocol comprises one of Code Division Multiple Access (CDMA) protocol, Global System for Mobile Communications (GSM) protocol, Advanced Mobile Phone System (AMPS) protocol, Time Division Multiple Access (TDMA) protocol, and a satellite compatible protocol.

6. The method of claim 1, further comprising:
associating a customer account with the communication based at least in part on the telemetry data, wherein the telemetry data comprises a device identifier uniquely associating the remote terminal with the customer account.

7. The method of claim 6, wherein the communication path comprises a direct-inward-dial phone number to route the voice data over the public switched telephone network connection, and wherein the voice data arrives at the operator station less than 15 seconds after receipt of the communication at the service provider.

8. The method of claim 1, wherein the telemetry data comprises at least one of:
an event code describing an event detected at the remote terminal, a device identifier uniquely identifying the remote terminal to the service provider, and an alphanumeric code transmitted from the remote terminal describing a destination for the communication.

9. The method of claim 8, further comprising:
parsing the event code from the telemetry data; and
either selecting the call center to receive the message based at least in part on the event code, or embedding the event code into the message before sending the message to the call center selected.

10. The method of claim 9, wherein the event code is selected from a group of event codes comprising: a car accident, a vehicle diagnostics error, a vehicle lockout, a security system alarm, an HVAC (heating, ventilation, and air-conditioning) system malfunction, a distress signal, a concierge request, a high-value customer contact, a standard customer contact, a priority vehicle model contact, a wireless telephone call, an electronic monitoring device alarm, a "9-1-1" emergency services telephone call, or a wearable medical assistance device contact.

11. The method of claim 10, wherein the remote terminal comprises a telephonic device selected from the group consisting of: a wireless handset, a telephonic vehicle, a telephonic security system, a telephonic HVAC (heating, ventilation, and air-conditioning) system, an electronic monitoring device, an electronic tracking device, a temperature monitoring device, a fire detection device, a moisture detection device, a location detection device, a television set-top box, a satellite signal receiver, a wearable medical alert telephonic device, a telephonically enabled tractor-trailer, or a combination thereof 12. The method of claim 1, wherein the call center comprises a plurality of operators associated with the plurality of operator stations, and wherein each operator station comprises a computer, a computer display, a telephone, a telephone head-set, and a connection with a database to receive correlated data associated with the communication.

13. The method of claim 1, wherein selecting the call center comprises parsing the alphanumeric code from the telemetry data and selecting the call center based at least in part on the alphanumeric code.

14. The method of claim 13, wherein selecting the call center based at least in part on the alphanumeric code comprises comparing the alphanumeric code with alphanumeric sequences in a database, and wherein comparing the alphanumeric code with the alphanumeric sequences in the database comprises one or more of:
indicating the alphanumeric code matches an alphanumeric sequence in the database;
indicating a beginning portion of the alphanumeric code matches the alphanumeric sequence in the database;
indicating a middle portion of the alphanumeric code matches the alphanumeric sequence in the database;
indicating a trailing portion of the alphanumeric code matches the alphanumeric sequence in the database; and
cross-referencing the alphanumeric code with corresponding data in the database.

15. The method of claim 14, wherein cross-referencing the alphanumeric code with the corresponding data in the database comprises:
using the corresponding data to send the message to the call center, wherein the corresponding data comprises at least an Internet Protocol (IP) address for a server connected with the call center.

16. The method of claim 13, further comprising:
performing regular-expression pattern matching, or wildcard pattern matching, or character-position pattern matching against the alphanumeric code.

17. The method of claim 1, wherein the side-channel comprises an Internet connection established through an Internet Service Provider ("ISP"), and wherein the PSTN connection comprises a telecommunications circuit established through a telecommunications carder.

18. The method of claim 1, wherein sending the message to the call center over the side-channel further comprises:
   parsing the alphanumeric code associated with the received communication from the telemetry data; and
   retrieving an internet address for a server at the call center from a database connected with the service provider, wherein retrieving the internet address comprises querying the database for information based, at least in part, on the alphanumeric code and receiving the internet address from the database; and
   sending the message to the server at the call center using the Internet address retrieved from the database via the side-channel, wherein the side-channel comprises an Internet connection established via an Internet Service Provider (ISP).

19. The method of claim 18, further comprising:
   receiving a response to the message from the server at the call center via the side-channel, the response to the message comprising the communication path for the one operator station connected with the call center, wherein the communication path comprises a direct phone number to the one operator station, the one operator station selected by the server at the call center based at least in part on the telemetry data.

20. The method of claim 19, wherein sending the voice data to the one operator station over the PSTN connection via the communication path comprises forwarding the voice data to the communication path in the form of a forwarded telephone call.

21. A system comprising:
   a service provider to receive a communication from a remote terminal, wherein the communication to be transmitted to the service provider via a telephone exchange, and wherein the communication comprises telemetry data and voice data;
   a database server connected with the service provider to select a call center from a plurality of call centers to receive the voice data, based at least in part on the telemetry data of the communication;
   a message for transmission from the service provider to the call center over a side-channel, the message comprising at least a portion of the telemetry data, and further comprising a request for a communication path to one of a plurality of operator stations connected with the call center; and
   a forwarded transmission to carry the voice data from the service provider to the one operator station over a public switched telephone network (PSTN) connection, wherein the PSTN to route the forwarded transmission via the communication path requested.

22. The system of claim 21, wherein the service provider to receive the communication from the remote terminal comprises the service provider to receive the telemetry data via a wireless messaging protocol and wherein the service provider to receive the communication from the remote terminal further comprises the service provider to receive the voice data via a wireless voice transmission protocol.

23. The system of claim 21, wherein the telemetry data comprises a device identifier to uniquely correlate the remote terminal with a customer account stored at either the database server connected with the service provider or a second database server connected with the call center, or both.

24. The system of claim 23, wherein the service provider to further encode the device identifier into the message, and transmit the message to the call center, and wherein
   the service provider to further receive a response to the message comprising at least a communication path for the one operator station connected with the call center to receive the voice data.

25. The system of claim 21, further comprising:
   a fall-back routing instruction to direct the voice data to a call center when the message fails to yield a response from the call center, wherein the fall-back routing instruction comprises one of:
   a first instruction to forward the voice data from the service provider to the alphanumeric code received from the remote terminal; and
   a second instruction to forward the voice data from the service provider to a hold-queue associated with the call center, wherein a phone number for the hold-queue is retrieved from a database connected with the service provider.

26. The system of claim 21, wherein selecting the call center to receive the voice data from the plurality of call centers comprises selecting the call center based on a time zone value associated with the remote terminal encoded in the telemetry data, wherein the call center selected resides in a time zone matching the time zone value.

27. The system of claim 21, wherein selecting the call center to receive the voice data from the plurality of call centers comprises selecting the call center based on a geographic location value associated with the remote terminal and encoded into the telemetry data by either the remote terminal or the telephone exchange, wherein the call center selected is the call center closest in distance to the geographic location value associated with the remote terminal.

28. The system of claim 21, wherein selecting the call center to receive the voice data from the plurality of call centers comprises selecting the call center based on a temporary telephone number utilized by the remote terminal to connect with the telephone exchange and encoded into the telemetry data by either the remote terminal or the telephone exchange, and wherein the call center selected comprises an emergency services dispatch center pre-determined to provide emergency services to a range of telephone numbers comprising the temporary telephone number utilized by the remote terminal.

29. The system of claim 21, wherein selecting the call center to receive the voice data from the plurality of call centers comprises selecting the call center based on a preferred language associated with the remote terminal determined based at least in part on the telemetry data, wherein the call center selected comprises operators pre-determined speak a language matching the preferred language associated with the remote terminal.

30. The system of claim 21, wherein selecting the call center to receive the voice data from the plurality of call centers comprises selecting the call center based on a subscription tier value associated with the remote terminal and determined based at least in part on the telemetry data, wherein the call center selected comprises operators trained specifically to service communications matching the subscription tier value associated with the remote terminal.

31. A remote terminal comprising a computer readable medium having instructions stored thereon that, when executed by hardware embedded in the remote terminal, causes the remote terminal to:
   transmit a communication to a service provider via a central office, wherein the communication comprises voice data and telemetry data, wherein the service provider to select a call center from a plurality of call centers to receive the voice data, based at least in part on the telemetry data of the communication, send a message to the call center over a side-channel, the message comprising at least a portion of the telemetry data, and further comprising a request for a communication path to one of a plurality of operator stations connected with the call center, and forward the voice data to the one operator station over a public switched telephone network (PSTN) connection via the communication path requested from the call center.

32. The remote terminal of claim 31, wherein the remote terminal to transmit the communication to the service provider via the central office comprises the remote terminal to transmit the telemetry data via a wireless messaging protocol and wherein the remote terminal to transmit the communication to the service provider via the central office further comprises the remote terminal to transmit the voice data via a wireless voice transmission protocol.

33. The remote terminal of claim 31, wherein the instructions further cause the remote terminal to encode a device identifier into the telemetry data, the device identifier uniquely associating the remote terminal with a customer account.

34. The remote terminal of claim 31, wherein the instructions further cause the remote terminal to detect an event at the remote terminal, generate an event code based at least in part on the event detected and encode the event code in the telemetry data of the communication.

* * * * *